United States Patent Office 3,335,070
Patented Aug. 8, 1967

3,335,070
PHENOL PURIFICATION BY BASE ADDITION
AND PLURAL DISTILLATION
Donald A. Adams, Wenonah, N.J., assignor to Hercules
Incorporated, a corporation of Delaware
No Drawing. Filed June 18, 1964, Ser. No. 376,224
3 Claims. (Cl. 203—37)

This invention relates to an improved process for the purification of phenol containing genetic impurities. More particularly, this invention relates to an improved process for the purification of phenol obtained by the oxidation of cumene and subsequent cleavage of the hydroperoxide produced.

A process of purifying phenol obtained by the cumene oxidation method is disclosed in U.S. 2,992,169, issued July 11, 1961, to G. P. Gregory and J. R. Nixon. This patent describes the nature of the genetic impurities which are present in phenol obtained by cumene oxidation and one method of purifying phenol containing such genetic impurities. The process involves contacting phenol in the liquid phase with a basic reagent at a temperature in the range of about 20° C. to about 250° C. for at least about 0.25 hour, fractionally steam distilling the phenol and finally subjecting the treated phenol to fractional distillation to recover a purified phenol.

Another process of purifying phenol containing genetic impurities has now been discovered. This process, like that of the above patent, involves a combination of steps which results in a final phenol fraction which is substantially free of all genetic impurities.

Broadly, the purification process of this invention is directed to a method of purifying phenol obtained from a cumene hydroperoxide cleavage mixture, which phenol is substantially free of acetone, which comprises the steps of (1) contacting said phenol with a basic reagent for at least about 0.25 hour, (2) separating from said phenol the products formed by contacting said basic reagent with said phenol, (3) fractionally steam distilling said phenol and (4) fractionally distilling said treated phenol to obtain a phenol which is substantially free of all genetic impurities.

More definitely, the purification process of this invention is one comprising the steps of contacting a phenol containing genetic impurities, in the liquid phase with a reagent consisting essentially of a base or an aqueous solution thereof, maintaining the reagent in contact with the phenol at a temperature in the range of about 20° C. to about 250° C. for at least about 0.25 hour to effect reaction of the alkyl-substituted benzofuran precursors whereby the latter are converted into reaction products which are separable from the phenol, separating these reaction products from the phenol immediately subsequent to the basic reagent treatment step, fractionally steam distilling the phenol, after the treatment with the basic reagent, to effect removal of the alkyl-substituted benzofurans, and finally subjecting the treated phenol to fractional distillation to recover a phenol which is substantially free of all genetic impurities.

The improvement of this invention involves treatment with the prescribed reagents of any predominantly phenol-containing material existing in the distillative recovery system after the acetone has been removed from the cleavage mixture. The predominantly phenol-containing material may be illustrated by the bottom product from the removal of acetone from the cleavage mixture, by the overhead crude phenol separated from higher boiling materials such as acetophenone, cumylphenol and dimethylphenylcarbinol, by the phenol stored prior to final batch distillation, and by the final product phenol isolated by batch or continuous distillation. These are all descriptive of materials obtainable in a substantially continuous distillation system, involving a series of columns, but comparable or related materials obtained by batchwise fractionation also may be treated. All of these materials may be defined as impure phenols to the extent they contain genetic impurities.

The process of this invention is illustrated by the following examples.

Example 1

Cumene was oxidized to the hydroperoxide and the hydroperoxide was subjected to acid cleavage. The acid catalyst in the cleavage mixture was neutralized and the mixture was separated from the products of the neutralization reaction. The neutralized cleavage mixture was subjected to fractional distillation in a series of columns.

In the first column, acetone was taken overhead and aqueous 20% sodium hydroxide was added to the reflux of the column so that the bottoms product contained about 1% sodium hydroxide. At this point, the bottoms product contained a mixture of phenol, some cumene and α-methylstyrene, high boiling material composed primarily of acetophenone, cumylphenol and dimethylphenylcarbinol, and genetic impurities composed primarily of 2-methyl-benzofuran, mesityl oxide, and the reaction product of the sodium hydroxide with alkyl-substituted benzofuran precursors. (This reaction product will be referred to as the "caustic heel.") The treated product was then separated in the next column into an overhead crude phenol fraction and a high boiling residue comprising acetophenone, cumylphenol, dimethylphenylcarbinol and the "caustic heel."

The crude phenol fraction contained approximately 170 parts per million (p.p.m.) 2-methylbenzofuran (2-MBF), determined by ultraviolet analysis, and it was subjected to efficient fractional steam distillation in a third column. Overhead products of water, cumene, α-methylstyrene and 2-MBF were removed by the distillation, leaving a crude phenol bottoms product with no 2-MBF detectable.

This crude phenol was then fractionally distilled at a pressure of 33 mm. Hg absolute at the top of the column and at a pot temperature maintained at about 157° to about 169° C. The overhead phenol fraction contained 3.5 p.p.m. of 2-MBF.

Example 2

Cumene was oxidized to the hydroperoxide and the hydroperoxide was subjected to acid cleavage. The acid catalyst in the cleavage mixture was neutralized and the mixture was separated from the products of the neutralization reaction. The neutralized cleavage mixture was subjected to fractional distillation in a series of columns. In the first column, acetone was taken overhead, leaving as bottoms product a mixture of phenol, some cumene and α-methylstyrene, a high boiling material composed primarily of acetophenone, dimethylphenylcarbinol and cumylphenol and genetic impurities composed primarily of 2-MBF, mesityl oxide, and 2-MBF precursors. The bottoms product was separated in the next column into an overhead phenol fraction and a high boiling residue.

The crude phenol fraction was subjected to the treatment of 20% aqueous sodium hydroxide in a treatment tank for 48 hours at a temperature of 110° C. The treated phenol fraction was then distilled in the next column, at a pot temperature of 95 to 175° C. under a pressure of 288 mm. of Hg absolute at the top of the column for about 5 hours to separate therefrom the caustic heel. The distillate, composed primarily of phenol, contained 26 p.p.m. 2-MBF.

This distillate was next steam distilled in the fourth column to remove therefrom the 2-MBF and mesityl oxide impurities. The treated phenol, upon fractional distillation at a pot temperature of 159-180° C. and a pressure of 290 mm. of Hg. absolute at the top of the column, gave an overhead product phenol containing about 2 p.p.m. 2–MBF.

*Example 3*

Cumene was oxidized to the hydroperoxide and the hydroperoxide was subjected to acid cleavage. The acid catalyst in the cleavage mixture was neutralized and the mixture was separated from the products of the neutralization reaction. The neutralized cleavage mixture was subjected to fractional distillation in a series of columns. In the first column, acetone was taken overhead, leaving as bottoms product a mixture of phenol, some cumene and α-methylstyrene, a high boiling material composed primarily of acetophenone, dimethylphenylcarbinol and cumylphenol and genetic impurities composed primarily of 2–MBF, mesityl oxide, and 2–MBF precursors. In the second column, high boiling materials were removed from bottom of column while a crude phenol containing water, cumene, α-methylstyrene, mesityl oxide, 2–MBF, and 2–MBF precursors was obtained as an overhead product.

The crude phenol fraction contained approximately 50 p.p.m. of 2–MBF as determined by ultraviolet analysis, and it was subjected to efficient fractional steam distillation in a third column. Overhead azeotropes of water with α-methylstyrene, cumene and 2–MBF were removed by the distillation, leaving a crude phenol bottoms product containing substantially no 2–MBF. To the crude phenol bottoms product then was added sufficient aqueous 20% sodium hydroxide to adjust the pH to 8.9, and the resulting mixture was maintained in a treatment tank at a temperature of 100° C. for 48 hours.

The treated phenol was then distilled at a pressure of 194 mm. Hg with no reflux for about four hours and a pot temperature of 75° C. to 165° C. The overhead phenol product contained 18 p.p.m. of 2–MBF. This overhead phenol product was then steam distilled to remove therefrom the 2–MBF which had formed during the treatment and distillation steps, leaving a crude phenol bottoms product.

This crude phenol product was subjected to fractional distillation at a pressure of 312 mm. Hg absolute and at a pot temperature of about 155–200° C. The overhead phenol product contained no detectable amount of 2–MBF.

*Example 4*

Cumene was oxidized to the hydroperoxide and the hydroperoxide was subjected to acid cleavage. The acid catalyst in the cleavage mixture was neutralized and the mixture was separated from the products of the neutralization reaction. The neutralized cleavage mixture was subjected to fractional distillation in a series of columns.

In the first column, acetone was taken overhead and aqueous 20% sodium hydroxide was added to the reflux of the column so that the bottoms product contained about 1% sodium hydroxide. At this point, the bottoms product contained a mixture of phenol, some cumene and α-methylstyrene, high boiling material composed primarily of acetophenone, cumylphenol and dimethylphenylcarbinol, and genetic impurities composed primarily of 2-methyl-benzofuran, mesityl oxide, and the reaction product of the sodium hydroxide with alkyl-substituted benzofuran precursors. This bottoms product was sent to a treatment tank wherein the sodium hydroxide was allowed to tie up the precursor-type impurity by maintaining the sodium hydroxide in contact with the phenol fraction for about 24 hours at a temperature of about 190° C. The treated product was then separated in the next column into an overhead crude phenol fraction and a high boiling residue comprising acetophenone, cumylphenol, dimethylphenylcarbinol and the "caustic heel."

The crude phenol fraction was subjected to efficient fractional steam distillation in a third column. Overhead products of water, cumene, α-methylstyrene and 2–MBF were removed by the distillation, leaving a crude phenol bottoms product with no 2–MBF detectable.

This crude phenol was then fractionally distilled at a pressure of 333 mm. Hg absolute at the top of the column and at a pot temperature maintained at about 157° to about 169° C. The overhead phenol fraction contained no detectable 2–MBF.

As previously stated, the improvement of this invention involves the separation, from a phenol fraction containing genetic impurities, of the product from the reaction of a basic reagent with the alkyl-substituted benzofuran precursor-type genetic impurity immediately subsequent to the basic reagent treatment step. The improved process of this invention thus includes a particular combination of steps involving treating a phenolic material with a basic reagent, separating the high boiling material formed by the reaction of the basic reagent with the phenolic material containing genetic impurities, fractional steam distilling to remove alkyl-substituted benzofurans from the phenolic material, and finally fractionally distilling to recover pure phenol.

In carrying out the treatment of the phenol material with a basic reagent, several alkaline materials may be utilized. Particularly preferred are those materials which have an ionization constant greater than $8.6 \times 10^{-5}$ as measured at 25° C. Exemplary bases are the alkali metal hydroxides such as sodium hydroxide and potassium hydroxide, and the alkaline earth metal oxides and hydroxides such as lime, calcium hydroxide and barium hydroxide. A further discussion of the basic reagents which may be employed is given in U.S. 2,992,169, column 6, line 40, column 7, line 40. What is there discussed is applicable to this invention.

The fractional steam distillation step of this invention must be operated with sufficient efficiency that the alkyl-subsituted benzofurans such as 2–MBF are substantially removed from the predominantly phenol-containing material. It is preferred that after the steam distillation the phenol-containing material will contain an amount of alkyl-substituted benzofuran corresponding to a content of 2–MBF not exceeding about 10 parts per million, corresponding approximately to a chlorination color of not greater than 0.5 absorbance units at 540 m$\mu$. The presence of other color-forming impurities, e.g., mesityl oxide, will result in absorbance unit values higher than those obtainable due to 2–MBF alone. However, the values actually obtained may be converted to represent only the amount of 2–MBF present. The steam distillation should be carried out continuously in an efficient column, for example, one having 20–40 plates. Ordinary batch steam distillation is comparatively ineffective.

The step of separating the products formed by the reaction of the basic reagent with the phenol fraction is preferably carried out by distillation. The distillation occurs, for example, at pressures of about 100 mm. to about 760 mm. of Hg absolute as measured at the top of the column and at temperatures of about 110° C. to about 180° C. Normally, before this separation occurs, the phenol fraction is held in the presence of a basic reagent for a sufficient amount of time to effect conversion of the precursor type impurity into reaction products which are separable from phenol by distillation. This treatment is preferably conducted for about four hours to about forty-eight hours at a temperature of about 100° C. to about 190° C. when sodium hydroxide is the basic reagent. However, as little time as 0.25 hour and as much as 100 hours, and temperatures of from 20° C. to 250° C. are applicable. It is possible to separate without stopping for extended treatment but the phenol ultimately obtained thereby is not as pure.

The steps of contacting the phenol fraction with a basic reagent and separating the products formed by the reaction of the basic reagent with the phenol fraction may be carried out at any of several stages in the overall process. Examples 1–4 indicate four possible variations.

The preferred method of carrying out the purification process of this invention is demonstrated by Example 4. Example 3 illustrates the procedure which should be followed if it is desired to treat the phenol fraction with a basic reagent subsequent to the steam distillation step. The reason why this procedure is followed is because some 2–MBF is formed during the steps of contacting the phenol fraction with the basic reagent and separating the product formed thereby, and an additional steam distillation is required to remove the newly formed 2–MBF.

In any event, the important step is the separation of the products formed by the reaction of the basic reagent with the phenol fraction from the phenol fraction prior to the final fractional distillation to recover purified phenol. This separation step should occur immediately subsequent to the alkali treatment step.

The phenol-containing material from the steps of treatment with a basic reagent, of separation of the products formed by the reaction of the basic reagent with the phenol fraction, and of steam distillation, is then subjected to fractional distillation in the absence of water other than that which may be present in the phenool. If low boiling compounds and water are present, they are removed as overhead, and pure, dry phenol is taken as a next overhead fraction or as a side stream, leaving as undistilled residue those compounds which are non-volatile or having boiling points higher than phenol. Moreover, it is possible that complete separation of phenol and acetophenone did not occur earlier in the distillative recovery system, and the desired separation may accordingly be effected in the final fractional distillation step.

The final fractional distillation step may be carried out under reduced pressure, for example, about 100 to about 600 mm. of Hg absolute as measured at the top of the column. These pressures will permit pot temperatures of about 150° C. to about 180° C. Since the precursor type impurity is not present during this final distillation step, severe operating conditions are not detrimental to the quality of the phenol.

What I claim and desire to protect by Letters Patent is:

1. The method of purifying phenol obtained from a cumene hydroperoxide cleavage mixture. which phenol is substantially free of acetone, which comprises the steps of (1) contacting said phenol for at least about 0.25 hour with a basic reagent consisting essentially of a material selected from the group consisting of a base and an aqueous solution thereof, said reagent being in an amount sufficient to adjust the pH of the phenol to a value in the range of about 6.0 to about 8.5, (2) separating by fractional distillation of the basic reagent-treated phenol an overhead fraction containing phenol and a bottoms fraction containing the products formed by contacting the phenol with said basic reagent, (3) fractionally steam distilling said overhead fraction containing phenol, recovering the phenol as the bottoms product and (4) fractionally distilling said bottoms product to obtain a phenol which is substantially free of all genetic impurities.

2. The method of claim 1 wherein the basic reagent is sodium hydroxide.

3. The method of claim 2 wherein the sodium hydroxide is contacted with the phenol for about four hours to about forty-eight hours at a temperature of about 100° C. to about 190° C.

References Cited
UNITED STATES PATENTS

| | | | |
|---|---|---|---|
| 2,662,848 | 12/1953 | Emerson et al. | 203—37 |
| 2,971,893 | 2/1961 | Hood | 203—37 |
| 2,992,169 | 7/1961 | Gregory et al. | 203—36 |
| 3,102,149 | 8/1963 | Barry | 203—37 |

NORMAN YUDKOFF, *Primary Examiner.*

WILBUR L. BASCOMB, JR., *Examiner.*